No. 778,978. PATENTED JAN. 3, 1905.
J. KINGORY.
STEAM COOKER.
APPLICATION FILED FEB. 27, 1904.
2 SHEETS—SHEET 1.
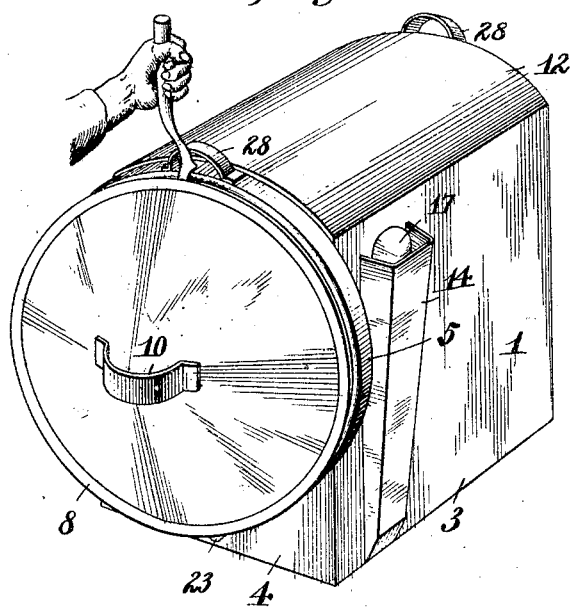
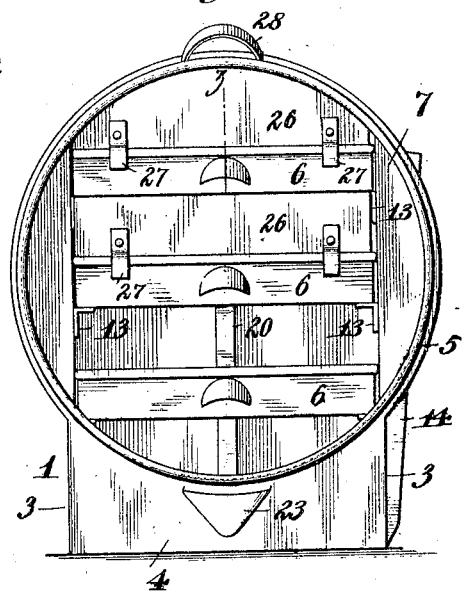
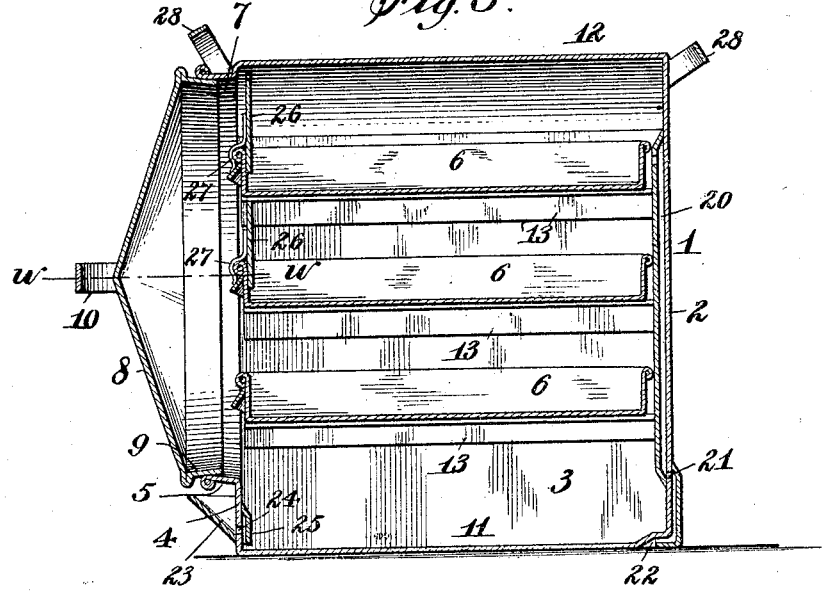
Witnesses: Joseph Kingory, Inventor
Julius Lankes
Bert Wason By Neuhart & Burkhart
Attorneys.

No. 778,978. PATENTED JAN. 3, 1905.
J. KINGORY.
STEAM COOKER.
APPLICATION FILED FEB. 27, 1904.
2 SHEETS—SHEET 2.
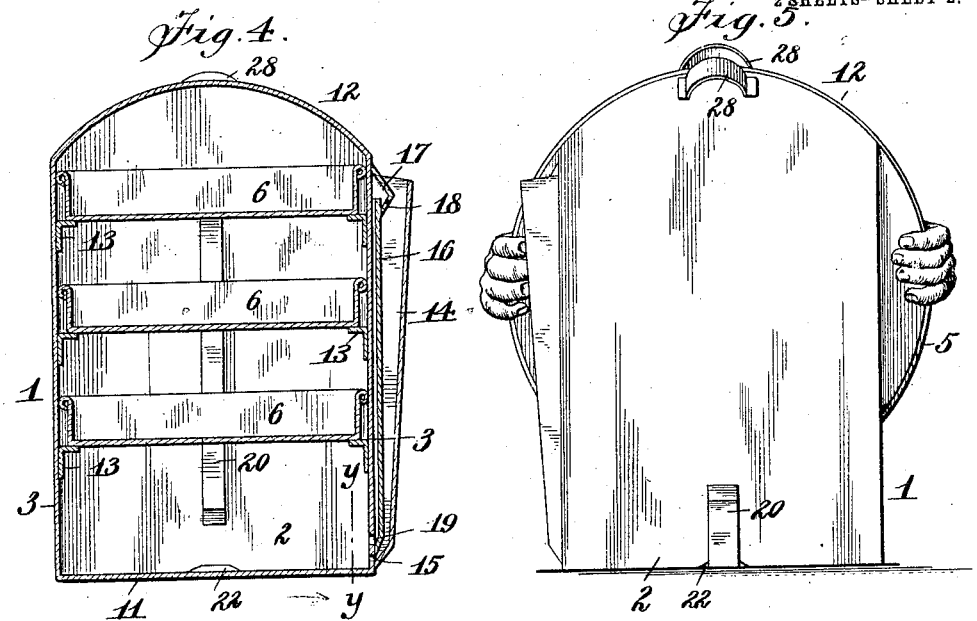
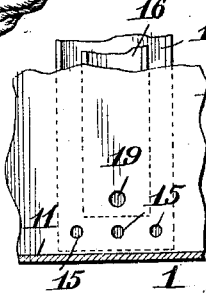
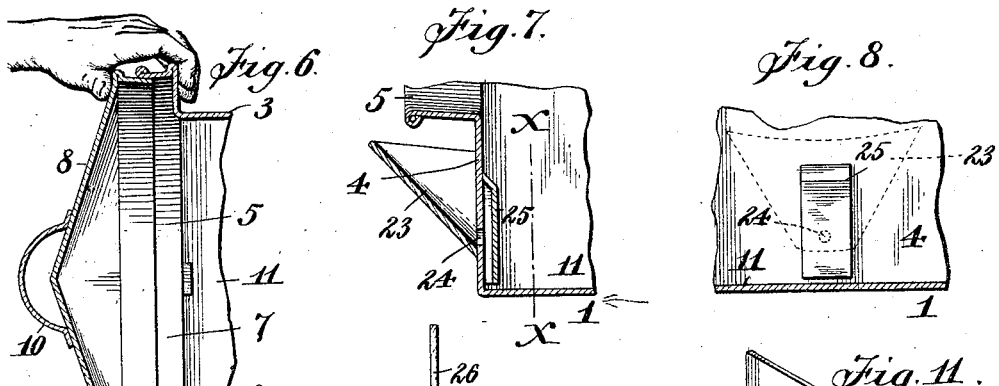
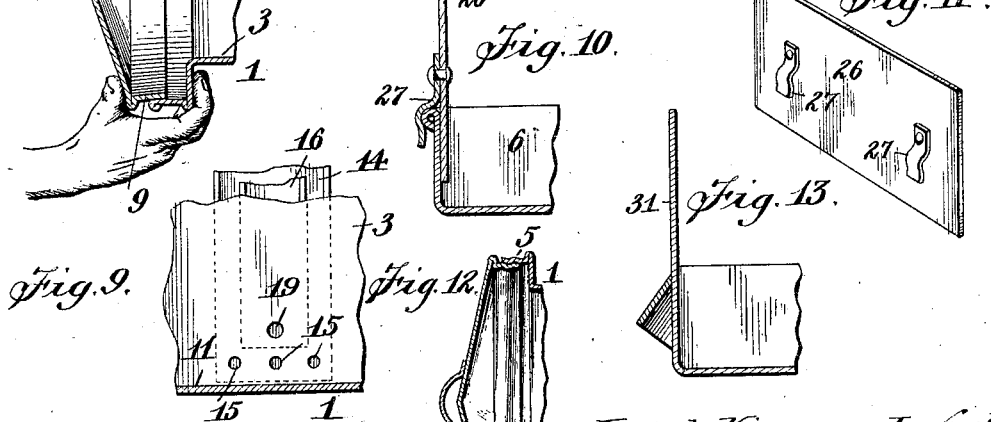
Witnesses:
Julius Lankes
Bert Mason
Joseph Kingory, Inventor,
By Neuhart & Burkhart
Attorneys.

No. 778,978. Patented January 3, 1905.

UNITED STATES PATENT OFFICE.

JOSEPH KINGORY, OF BUFFALO, NEW YORK.

STEAM-COOKER.

SPECIFICATION forming part of Letters Patent No. 778,978, dated January 3, 1905.

Application filed February 27, 1904. Serial No. 195,607.

*To all whom it may concern:*

Be it known that I, JOSEPH KINGORY, a citizen of the United States, residing at Buffalo, in the county of Erie and State of New York, have invented certain new and useful Improvements in Steam-Cookers, of which the following is a specification.

My invention relates to steam-cookers; and it has for its object the production of a device for cooking food by steam which provides in its construction for the use of a number of food-trays, any one of which can be removed from and inserted into the cooker without disturbing any other tray, and in conjunction with such an arrangement rendering the cooker steam-tight by providing a circular opening in the casing into which a circular door or cover is inserted.

Other objects are to simplify the construction of such a device and improve the cooker in other particulars, as will hereinafter appear.

This invention consists in a rectangular casing permitting the use of a number of trays supported one above the other on ledges within the casing and having a circular opening in which a circular cover or door is held.

It also consists in providing at the front end of the rectangular casing a cylindrical enlargement extending beyond the vertical side walls thereof, which permits of the use of a number of trays of equal width, so as to fit properly within the casing.

It further consists in the novel construction, arrangement, and combination of parts to be hereinafter described, and particularly pointed out in the appended claims.

Referred to the drawings, Figure 1 is a perspective view of my improved steam-cooker. Fig. 2 is a front elevation of the same with its cover removed. Fig. 3 is a central longitudinal section of the cooker. Fig. 4 is a transverse section taken on a plane cutting through the steam and water tubes. Fig. 5 is a rear view of the same. Fig. 6 is a horizontal section taken on line *w w*, Fig. 3, the trays being omitted. Fig. 7 is an enlarged vertical section through the drip-funnel and the lower front end of the casing. Fig. 8 is a section taken on line *x x*, Fig. 7. Fig. 9 is an enlarged section taken on line *y y*, Fig. 4. Fig. 10 is an enlarged vertical section taken on line *z*, Fig. 2. Fig. 11 is a detached perspective view of one of the detachable steam-check plates. Fig. 12 is a central vertical section, on a reduced scale, showing the cylindrical extensions provided with suitable screw-threads and the cylindrical flange of the cover provided with corresponding screw-threads. Fig. 13 is an enlarged vertical section of a food-tray having the front wall thereof extended to close the steam-passage between the same and the tray next above.

Referring to the drawings like numerals of reference refer to like parts in the several figures.

The reference-numeral 1 designates the casing, which in the main is rectangular in form, comprising a rear wall 2, vertical side walls 3, and open front wall 4, having a cylindrical forward extension 5, larger in diameter than the width of the casing proper, so as to permit a number of trays 6, corresponding in width to the width of the casing, to be inserted into the latter one above the other. The said cylindrical enlargement is open at its front end to form a circular opening 7 for the casing, and to said circular opening a circular cover 8 is applied which has a cylindrical tapering flange 9, that fits into said opening, a suitable handle 10 being provided for said cover. The cylindrical enlargement is of slight depth and at diametrically opposite points extends beyond the vertical sides of the casing. This arrangement permits the cover to be securely forced into the cylindrical extension by grasping the latter and the cover, as shown in Fig. 6, and exerting pressure with the thumbs against the said cover.

The casing is provided with a flat bottom 11 and by preference with a curved top 12. Secured to the sides of the casing are horizontal angle-ledges 13, which form supports on which the trays 6 are held.

The casing is supplied with a quantity of water through a suitable tube 14, closed at its bottom and secured to one of the side walls 3, apertures 15 being formed in the latter at the lower end of said tube for admission of water to the casing. Secured to the said side wall within the water-supply tube 14 is a tube 16, having at its upper end a conical closure 17, provided with an aperture 18 and forming a steam-whistle. The lower end of the steam-tube 16 is closed, and in the wall of the casing is an aperture 19, through which steam passes when the level of the water is below the top of said aperture. The steam then passes through the steam-tube 16 and out through the steam-whistle, whereby notice is given that more water is needed in the cooker.

Secured to the rear wall of the casing is a tube 20, which opens at its upper end into the casing, preferably near the upper end thereof. The upper portion of this tube is secured to the inner side of the rear wall of the casing and communicates with the lower portion of the tube, which is secured to the outside of the rear wall by an aperture 21. The lower end of the tube terminates underneath the bottom of the casing, which is recessed, as at 22. The food odors pass into the tube 20 and down to the lower open end thereof, where they are consumed by the heat.

A drip-funnel 23 is secured to the front wall of the casing beneath the cylindrical extension 5, and in said wall at the lower end of said funnel is an aperture 24. When removing the circular cover, the condensed steam on the cylindrical flange thereof may drip into said drip-funnel when resting the cover for a moment on the latter, and the drippings from said cover pass through the aperture 24 into the casing. A hood 25 is secured to the inner face of the front wall to take off the pressure of the water within the casing, and thus permits the drippings from the drip-funnel to enter the casing without resistance.

By constructing the rectangular casing with a forward extension a free passage is allowed the steam in its ascent to the several trays. When it is desired to shut off the steam from the food in the trays or from the food in any one of the trays, I attach a steam-check plate 26 to the desired tray or trays. Each plate is provided with catch-springs 27, which grasp the upper end of the front wall of the trays, the plate lying against the inner side of the said front wall. This effectually closes the space between two trays or between the upper tray and the top wall of the casing.

For convenience in carrying the cooker handles 28 are provided. The front handle 28 extends over the cover and serves as a fulcrum-point for any convenient object used for prying the cover open, as shown in Fig. 1.

In Fig. 12 the cylindrical enlargement of the casing forming the circular opening is provided with suitable screw-threads 29 and is adapted to receive the threaded flange 30 of the cover. This arrangement may be used, if desired; but ordinarily frictional contact is sufficient to retain the cover within the opening.

In Fig. 13 the front wall of the tray is extended, as at 31, and thus the steam-check plate is formed integrally with the tray.

Having thus described my invention, what I claim is—

1. A steam-cooker comprising a rectangular casing having an open cylindrical extension at one end thereof, said cylindrical extension having its side portions extending beyond the side walls of said rectangular casing, trays arranged one above the other within said casing, and a circular cover for said cylindrical extension.

2. A steam-cooker comprising a rectangular casing having a cylindrical extension larger in diameter than the width of said casing, and a circular cover having a tapering circumferential flange entering said cylindrical extension.

3. In a steam-cooker, the combination of a casing having a plurality of supporting-ledges on each of its side walls, and a plurality of trays supported on said ledges one above the other, said trays being separated by intervening steam-spaces and the front walls of said trays having check-plates for closing the front end of said steam-spaces.

4. In a steam-cooker, the combination of a casing, trays supported within said casing one above the other and being separated by steam-spaces, and removable plates having catch-springs to fit over the front walls of said trays.

5. A steam-cooker comprising a rectangular casing having an open cylindrical extension at one end thereof, said open extension being wider than the casing, a circular cover for said extension, a funnel in the end wall of the casing underneath the center of said extension into which the drippings from the cover when being opened may drop.

6. A steam-cooker comprising a casing having a cylindrical extension at one end thereof larger in diameter than the diameter of the casing, and a circular cover for said cylindrical extension.

7. A steam-cooker comprising a casing having an extension at one end provided with a circular opening larger in diameter than the diameter of the casing, and a cover fitting said opening.

8. In a steam-cooker, the combination of a casing having one end thereof wider than the other end of the same and a circular opening in said wide end larger in diameter than the diameter of the opposite end of the casing, a series of trays arranged lengthwise in the casing, one above the other, and a cover fitting said circular opening.

In witness whereof I have hereunto affixed my signature in the presence of two subscribing witnesses.

JOSEPH KINGORY.

Witnesses:
 EMIL NEUHART,
 B. MASON.